Figure 1:
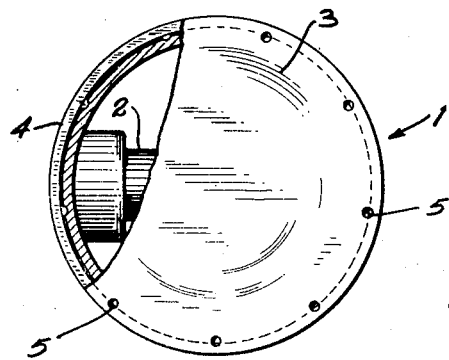

March 10, 1925.                                                1,528,817
J. DINNES
PISTON
Filed Aug. 18, 1924

Inventor
John Dinnes.
By A. J. O'Brien
Attorney

Patented Mar. 10, 1925.

1,528,817

UNITED STATES PATENT OFFICE.

JOHN DINNES, OF ENGLEWOOD, COLORADO.

PISTON.

Application filed August 18, 1924. Serial No. 732,880.

*To all whom it may concern:*

Be it known that I, JOHN DINNES, a citizen of the United States, residing at Englewood, county of Arapahoe, and State of Colorado, have invented certain new and useful Improvements in Pistons; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in pistons of the type employed in connection with internal combustion engines.

Experience has shown that it is a difficult thing to prevent oil from entering the combustion chamber of an internal combustion engine. The oil that enters the combustion chamber in excess of that actually required for lubrication is a positive detriment and causes the deposits of carbon, which decreases the efficiency by pre-ignition of the charge. Carbon is also objectionable for other causes and its formation is to be prevented whenever possible.

It is customary to provide resilient means between the piston ring and the bottom of the piston groove for the purpose of forcing the ring outwardly and also for sealing the space between the piston ring and the bottom of the groove. Steel springs, asbestos and cork have been employed in the piston ring grooves for the purpose pointed out.

It is the object of this invention to produce a piston of such construction that the pressure of the gases confined within the piston chamber shall be employed as a means for expanding the rings and causing them to hug the inner surface of the cylinder.

It is a further object of this invention to so construct a piston that oil seals will readily be formed between the piston and the cylinder sides, which will not only prevent the gases from passing into the crank case, but will also provide a lubricating film on the cylinder surface.

My invention, briefly described, comprises a piston having two or more piston ring grooves near its upper end. Openings are provided from the top of the piston to the upper piston ring groove so that gas under pressure may enter the space between the upper piston ring groove and the piston ring whereby a force is set up which tends to expand the piston ring. The gas pressure also has a tendency to drive oil out from the space between the ring and the walls of the groove. The lower piston ring groove has openings connecting with the interior of the piston. When the piston is employed in a two-cycle engine where the charge is compressed in the crank case, the pressure will tend to expand the lower ring in the manner explained in connection with the upper ring.

If, on the other hand, the piston is employed in a four-cycle engine, the openings from the lower piston groove serve merely to permit oil to flow back into the crank case.

Adjacent to the lower side of the lowermost piston ring groove, I provide an auxiliary shallow groove that connects with spiral grooves which extend to the lower edge of the piston. These spiral grooves serve to carry the oil down to the lower end of the piston. They form oil seals and serve to deposit a film of oil on the cylinder wall.

Figure 2:
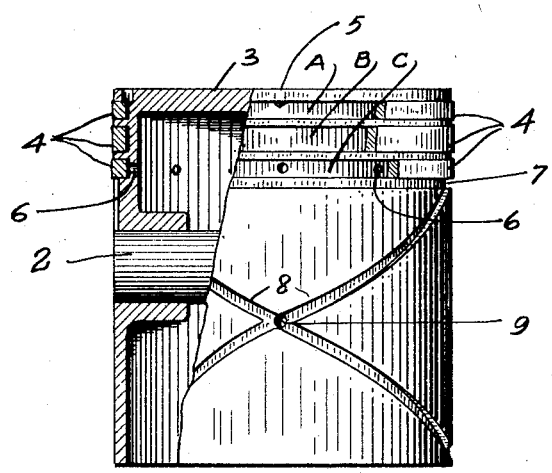

In order more clearly to describe my invention, I shall have reference to the accompanying drawing, in which the preferred form thereof is illustrated, and in which:

Fig. 1 shows a top plan view of one of my improved pistons, a portion thereof being broken away; and Fig. 2 shows a side elevation of my piston with parts broken away so as to show one side in section.

Numeral 1 indicates the piston as a whole. The size and shape of my piston is the same as any ordinary piston, but I have modified the same in several particulars. In the piston illustrated, 2 represents the wrist pin and 3 the top of the piston. Near the upper end of the piston I have shown three piston ring grooves A, B and C, within each of which there is a piston ring 4. The rings may be of any standard construction and may have either lapped or diagonal cut ends. The rings should be carefully fitted so that the ends come together as closely as possible. For the purpose of permitting gas under pressure to enter the space between the bottom of the upper ring groove A and the piston ring, I have provided a plurality of openings 5, which extend from the top of the piston to the interior of the groove. It is apparent that when the piston is in place in a cylinder and a charge is being compressed or exploded then the same pressure that exists within the piston chamber will also exist in the space between the piston ring and the bottom of the piston ring groove. This pressure will act like a spring and force the ring against the cylinder wall, thus insuring a tight fit which forms a tight seal. The pressure in the piston groove also prevents oil from entering the piston ring groove and this helps to keep the cylinders clean and prevents the formation of carbon. The idea of having the upper piston ring groove in direct communication with the explosion chamber is of great importance in producing a tight seal and keeping oil from entering the space above the piston.

In addition to the openings communicating with the upper groove, I provide several openings 6 in the wall of the lower piston ring groove. When the piston is used in a two-cycle engine, where the charge is compressed in the crank case, pressure will be exerted on the lower piston ring during each compression stroke and will force the same against the cylinder and prevent leakage. When the piston is employed in a four-cycle engine, however, there is no pressure below the piston and the openings 6 serve merely as a return for oil that might enter the groove. A shallow groove 7 is provided just below the lower piston groove. This serves to collect oil, forms an oil seal and provides a passageway for the oil so that it can enter the diagonal grooves 8, along which the oil flows. The grooves 8 may be spiral and each extend completely around the piston, but may be formed as shown or in any other way. The grooves 8 should, however, be so arranged that there will be no vertical element that is not crossed by one or more grooves. When the grooves cross, I prefer to drill a hole at the point of crossing in the manner indicated at 9.

From the above, it will be apparent that I have produced a piston of simple construction that will provide a very satisfactory seal, and which will prevent oil in appreciable quantities from entering the combustion chamber.

Having now described my invention, what I claim as new is:

A hollow piston having a plurality of piston ring grooves, rings in said grooves, said piston having openings connecting the upper groove with the top of the piston, and the lower groove with the interior of the piston, an auxiliary groove adjacent the lower edge of the lower groove, and spiral grooves connecting said auxiliary groove to the lower edge of the piston.

In testimony whereof I affix my signature.

JOHN DINNES.